United States Patent [19]

Gorsuch et al.

[11] Patent Number: 4,676,151
[45] Date of Patent: Jun. 30, 1987

[54] GROOVED BAKING PAN

[75] Inventors: Roger K. Gorsuch; Gordon D. Bell; Mitchell C. Henke; Michelle Wibel; Ronald E. Bratton; Effie J. Lee, all of Fort Wayne, Ind.

[73] Assignee: Lincoln Foodservice Products, Inc., Fort Wayne, Ind.

[21] Appl. No.: 772,038

[22] Filed: Sep. 3, 1985

[51] Int. Cl.[4] .................. A47J 27/026; A47J 27/14; B29C 67/00
[52] U.S. Cl. .................. 99/450; 99/DIG. 15; 249/135; 249/141
[58] Field of Search ........... 249/117, 135, 132, 141; 99/450, DIG. 15, 445

[56] References Cited

U.S. PATENT DOCUMENTS

| | | | |
|---|---|---|---|
| 264,867 | 9/1882 | Ege | 99/445 |
| 389,602 | 9/1888 | Sankey | 99/450 |
| 640,630 | 12/1899 | Rietzke | 99/445 |
| 883,296 | 3/1908 | Cook | 249/132 |
| 888,960 | 5/1908 | Clark | 99/422 |
| 1,781,302 | 11/1930 | Roberts | 99/450 |
| 1,899,682 | 2/1933 | Goldenberg | 99/445 |
| 1,945,397 | 1/1934 | Gray | 99/DIG. 15 |
| 2,494,043 | 1/1950 | Jocelyn | 249/141 |
| 2,802,411 | 8/1957 | Riener | 249/117 |
| 2,840,684 | 6/1958 | Watkins | 126/390 |
| 3,237,910 | 3/1966 | Lavedas | 249/117 |
| 4,154,861 | 5/1979 | Smith | 426/466 |
| 4,184,421 | 1/1980 | Ahlgren | 99/450 |
| 4,367,243 | 1/1983 | Brummett et al. | 426/303 |
| 4,378,729 | 4/1983 | Pierick | 99/400 |
| 4,384,513 | 5/1983 | Pierick | 99/400 |
| 4,462,383 | 7/1984 | Henke et al. | 126/21 A |

FOREIGN PATENT DOCUMENTS

| | | |
|---|---|---|
| 96136 | 7/1939 | Denmark . |
| 179530 | 1/1906 | Fed. Rep. of Germany ........ 99/445 |
| 911813 | 7/1946 | France . |
| 580412 | 10/1976 | Switzerland . |

OTHER PUBLICATIONS

Advertising Literature for Club Products Standex Co., Jacksonville, Ark. (2-1984).

Primary Examiner—Willard E. Hoag
Attorney, Agent, or Firm—Jeffers, Irish & Hoffman

[57] ABSTRACT

A grooved baking pan and a method for baking therewith wherein the bottom surface of the pan is provided with a plurality of grooves. In the preferred embodiment, the grooves are V-shaped. The grooves are arranged in a pattern such as a grid pattern and apertures are located in the areas bounded by the intersecting grooves. The pan is used to bake high density food products such as pizza in an impingement oven wherein columns of heated air are formed which are directed at localized areas of the bottom surface of the pan. The pan is moved relative to the impinging air columns while the food product is being baked.

19 Claims, 11 Drawing Figures

GROOVED BAKING PAN

BACKGROUND OF THE INVENTION

This invention relates to a baking pan and the like and to a method for baking food products therein. More specifically, this invention relates to a baking pan and a method for rapidly baking food products therein in an impingement type of oven.

In the fast food restaurant business, the speed at which food can be prepared is extremely important. Both the operators of fast food restaurants and the diners wish to have the food prepared in a short amount of time so that the amount of time a diner needs to wait for his food is relatively short. However, the speed at which the food is prepared should not detract from the quality of the food. Therefore, it is desirable to provide high quality food in a minimum amount of time.

With the popularity of pizza as a fast food, a number of different types of pizzas have become popular. In addition to the standard or conventional thin crust pizza, a number of deep dish pizzas have become available. These pizzas are in effect stuffed pizzas having a crust, and including various cheeses, vegetables, meats, and toppings. In addition, these pizzas sometimes contain another layer of crust with a further layer of cheese on top of that crust layer. If conventional equipment were used to bake the new type of pizzas in conventional pans, the time needed to properly prepare the pizzas would be longer than is desirable. On the other hand it is desirable to use standard conventional oven equipment to prepare the new stuffed type of pizzas since this would avoid the expense of purchasing new ovens. Furthermore, restaurant owners frequently wish to use only a single oven for preparing both conventional pizzas and the new type of pizzas at the same time. Thus, an oven might have in it at the same time one or more of the conventional pizzas and one or more of the new type of stuffed pizzas. It is therefore desirable to use a conventional oven for the preparation of stuffed pizzas.

A method which has been used successfully for preparing food products such as pizzas is described in U.S. Pat. No. 4,154,861. The method utilizes an impingement type of oven wherein a conveyor belt travels through an oven cavity and on which the containers with the food products are located. Columns of hot air are directed at the containers to bake the food products and to carry away moisture and other particles resulting from the cooking process. This method has been used commercially by many pizza establishments. Since the ovens which use this baking method have been designed so that the baking process is properly balanced in terms of the temperature of the hot air and the speed of the conveyor belt, it is desirable that a pan for baking a stuffed pizza or other food product in an impingement type of oven is designed in such a way as to be compatible with this type of oven.

Conventional cookware has been found to be inadequate for baking stuffed pizzas in an impingement type of oven because the baking time for baking a stuffed pizza in a conventional pan is too long, namely about 13 minutes, whereas the baking time for a conventional pizza in a conventional pan is approximately 8 minutes. It has therefore not been possible to use the same oven for simultaneously and concurrently baking a conventional or standard pizza product and a stuffed pizza product in an impingement oven.

One of the problems in cooking pizza is to rapidly bring the temperature of the center of the pizza below the top crust layer up to the proper temperature level which is somewhere in the range of 150° F. to 165° F. In an impingement oven the heat is applied to the top, sides and bottom of the pizza product and from those surfaces the heat travels inwardly by conduction into the pizza product. Therefore, a temperature gradient will be set up throughout the pizza. If too much heat is applied to the surfaces of the pizza, the temperature gradients in the pizza will be too high so that the surfaces of the pizza will cook too rapidly and will be subject to burning prior to proper cooking of the interior of the pizza. On the other hand, if too little heat is applied to the surfaces of the pizza the interior of the pizza product will be uncooked, thus causing undesirable quality of the finished product. The entire process therefore must be properly balanced to set up the proper temperature gradients within the product in an acceptable amount of time. It is therefore desired to provide a pizza pan for use with an impingement oven which enables the proper temperatures and temperature gradiants to be provided in a stuffed pizza in a minimum amount of time.

One additional problem which has been found with pizzas is that the cheese located on the top of the product melts at elevated temperatures and tends to form a seal, thus preventing further rapid addition of heat through the top surface of the pizza to aid in cooking the pizza product. Therefore, most of the heat for baking a pizza rapidly must be applied to the bottom of the pizza product. It is therefore desired to provide a pizza pan for use with an impingement oven wherein most of the heat is supplied through the bottom of the pan.

One further problem which has been encountered in baking pizzas of this type is that some of the baking takes place after the pizza has left the oven because the pan in which the pizza is contained will retain heat and continue to give up this heat to the pizza product. Therefore, if the thickness of the pan is too great, the product will continue to bake too long after it leaves the oven and become overcooked. On the other hand, if the thickness of the pan is too small, the baking process will stop too soon after the product leaves the oven, thereby leaving the pizza product undercooked.

Additionally, if too thick a pan material is used, it is not possible to heat the pan material up in a sufficiently short amount of time after the pan enters the oven to allow the pizza to be baked in the desired amount of time. On the other hand, if too thin a pan material is used, heat is given up too rapidly by the pan material to the pizza and not enough heat is stored in the pan to allow the crust of the pizza to be browned properly by the pan after the pizza leaves the oven. It is therefore desired to provide a pizza pan for preparing a stuffed pizza in an impingement oven wherein the thickness of the pan material is adequate to permit proper preparation of the pizza.

U.S. Pat. No. 4,378,729 discloses a pan for preparing pizza wherein a blast of hot air is funneled through a central vent opening in a baffle and wherein the pizza is located on a number of risers so that it is exposed directly to the hot air. The problem with this structure is that too much heat is applied directly to the pizza product, thus tending to overcook the bottom surface of the pizza while the pizza is in the oven. Furthermore, the baking process stops as soon as the pizza leaves the oven because there is no hot metal surrounding the pizza product to give off further heat to the pizza product.

U.S. Pat. No. 4,367,243 discloses a method for preparing pizza wherein a crust is first precooked and the remaining ingredients are then placed in the precooked shell whereafter the pizza is placed in a perforated pan and cooked in a forced air oven. This two-step process is also undesirable because of the amount of time taken to prepare a pizza in this manner.

It is furthermore desired to provide a baking pan and a method for baking a food product such as a stuffed pizza wherein a high quality food product is baked in a minimum amount of time in an impingement type of oven.

SUMMARY OF THE INVENTION

The present invention, in one form thereof, overcomes the disadvantages of the above-described prior art baking pans and baking methods for baking high density food products such as pizzas by providing an improved pan and a method for baking such products therein. The pan according to the present invention comprises a side and a bottom, the bottom having grooves therein. The grooves are shaped and arranged in such manner that the pan can be used to bake a stuffed pizza or other such high density food products with an impingement type of process in a short amount of time to provide a high quality baked food product.

The present invention, in one form thereof, comprises a pan having a grooved bottom which includes a plurality of apertures. The pan is used in an impingement oven wherein columns of heated air are directed onto the bottom surface of the pan for impinging upon localized areas thereof. Relative motion is established between the pan and the columns of heated air and the columns of heated air are arranged so that full coverage of the entire pan bottom is provided.

The present invention, in one form thereof, further comprises a pan having a pattern of grooves arranged in the outer surface of the bottom thereof and having a plurality of apertures arranged in the bottom of the pan. The apertures are more densely spaced at the center of the pan bottom surface than at the outside of the pan bottom surface. Furthermore, the apertures are arranged in such a way that they are located in the interstices formed by the pattern of grooves in the pan bottom. By using this pan with an impingement type of process wherein hot columns of air are directed at localized areas of the pan bottom, a baked high density food product such as for instance pizza of excellent quality is produced in a minimum amount of cooking time.

Another advantage of the pan of the present invention is that it can be used in an impingement oven to prepare stuffed pizzas concurrently and simultaneously with preparing conventional pizzas in conventional pizza pans.

Another advantage of the pan of the invention is that the proper amount of heat can be applied in a minimum amount of time to the bottom of the pan to prepare a high density food product in a desired amount of time.

A still further advantage of the pan of the invention is that heat will continue to flow from the pan bottom into the food product after the pan leaves the oven to cause further cooking of the food product.

A yet further advantage of the pan of the invention is that the food product will be cooked uniformly and properly so that a high quality food product results from a pan used in combination with an impingement type of oven.

The invention, in one form thereof, provides a baking pan comprising a side and a bottom, the outer bottom surface having a plurality of grooves therein, the sides of the grooves having at least a portion thereof inclined at less than 90° with respect to the surface.

The invention, in one form thereof, further provides a baking pan for baking a food product comprising an upstanding side, a generally flat bottom, the bottom including a plurality of V-shaped grooves in the outside surface of the bottom.

The invention, in one form thereof, still further provides a pan for baking a food product comprising a side, a bottom, the bottom having at least one aperture therein and one surface of said bottom including at least one groove therein.

The invention, in one form thereof, yet further provides a pan for preparing food product comprising a side portion, a bottom, the bottom including a plurality of grooves, and further including a plurality of apertures.

The invention, in one form thereof, also provides a baking pan comprising a side portion, a generally flat bottom including a plurality of V-shaped grooves located in the outer bottom surface the grooves arranged in a pattern, and the included angles defined by the sides of said grooves being in the range of 70° to 110° with respect to the surface. The bottom further includes a plurality of holes, the holes being located in at least some of the intensified surface areas bounded by the grooves, the density of holes being greatest in the center portion of the bottom surface and occupying a range of 5% to 40% of the total surface of the bottom.

The invention, in one form thereof, provides a method for baking a food product comprising providing a pan having an upstanding side and a bottom, the bottom including at least one groove, forming a plurality of columns of heated air, and directing the columns of air against the pan bottom surface for impingement against discreet points of the surface, and moving the pan relative to the columns of air.

The invention, in one form thereof, furthermore provides a method for baking a food product comprising providing a pan having an upstanding side and a bottom, the bottom including a plurality of V-shaped grooves and a plurality of apertures, forming a plurality of columns of heated air, impinging the columns of heated air on localized areas of the bottom, and moving the pan relative to the columns.

It is an object of the present invention to provide a baking pan for baking a stuffed pizza or other food product in a short amount of time.

Another object of the present invention to provide a baking pan which can be used with an impingement type of process.

It is yet another object of the present invention to provide a baking pan for baking a food product, the pan including grooves and apertures therein to allow the rapid addition of heat to the bottom of the other food product while allowing the baking process to continue after the pan leaves the oven.

It is a still further object of the present invention to provide a baking pan and a method for baking a food product therein wherein most of the heat is applied to the bottom of the pan.

It is a yet further object of the present invention to provide a baking pan of the proper thickness and configuration to properly bake a pizza or other food products in a short amount of time in an impingement type of oven.

It is still another object of the present invention to provide a baking pan having a bottom the effective surface area of which is increased by means of grooves and wherein a large amount of heat can be applied to the food product through the bottom of the pan.

It is a still further object of the present invention to provide a baking pan having an apertured bottom whereby heat is applied directly to the food product and to further provide a baking pan wherein the bottom continues to apply heat to the food product after the pan leaves the oven.

It is also an object of the present invention to provide a baking pan wherein a dense stuffed pizza or other food product is cooked uniformly in a short amount of time.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
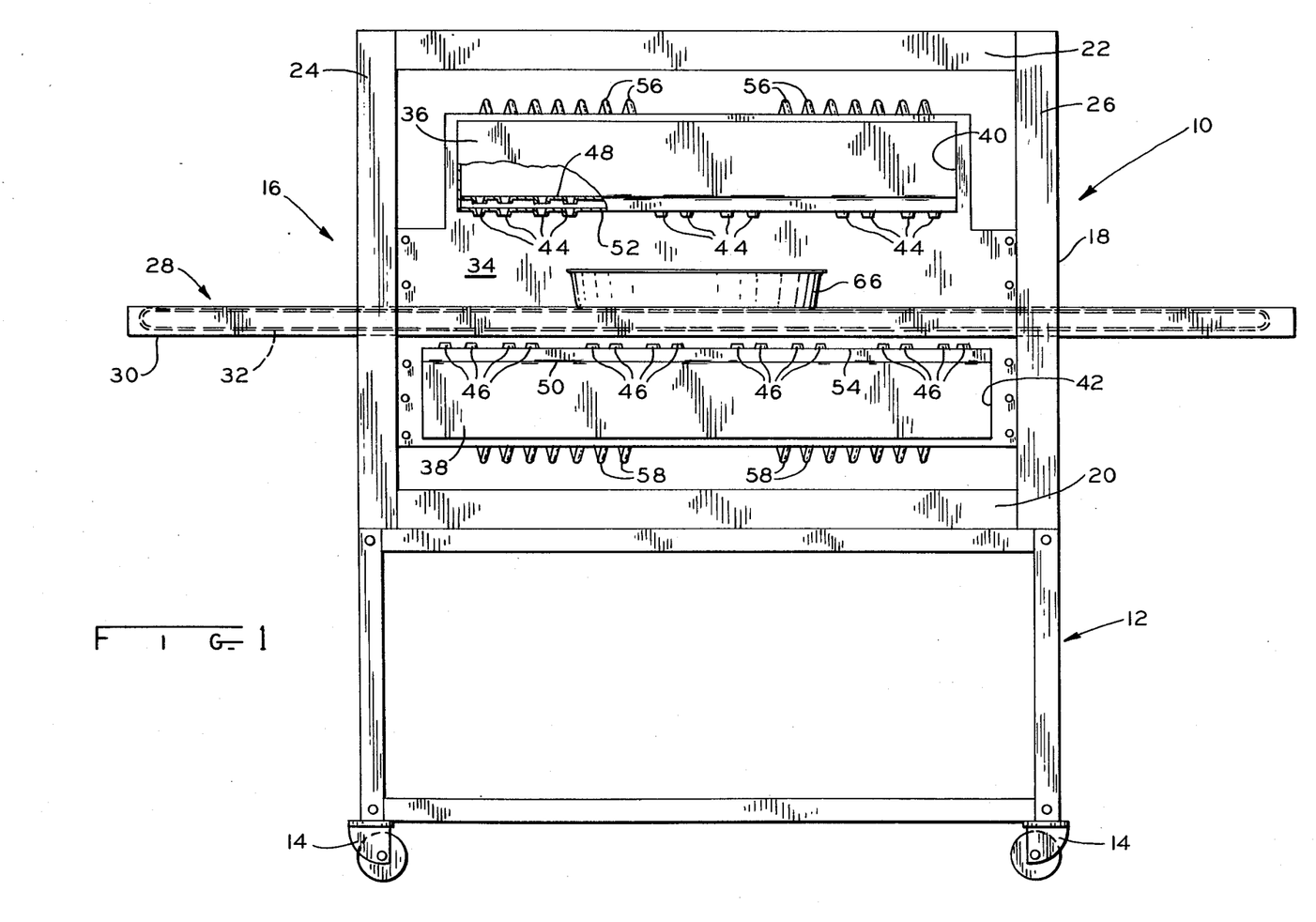
FIG. 1 is a partially broken away front elevational view of an impingement food preparation oven.

Referring to FIG. 1, an impingement food preparation oven 10 is illustrated comprising stand assembly 12 mounted on casters 14 and cabinet assembly 16 mounted on stand assembly 12. Cabinet assembly 16 includes an insulated oven enclosure 18 comprising insulated bottom wall 20, insulated top wall 22, insulated side walls 24 and 26, an insulated back wall (not shown), and a door assembly (not shown) including an insulated door hingedly attached to the cabinet assembly 16. A more detailed description of stand assembly 12 and cabinet assembly 16 as well as the manner of operation thereof is provided in U.S. Pat. No. 4,462,383 issued July 31, 1984 to Mitchell C. Henke and assigned to the same assignee of record as the instant patent application.

A conveyor assembly 28 is horizontally disposed in the oven enclosure and extends through openings (not shown) in side walls 24 and 26 to project outwardly of the oven cavity or cooking chamber 34. The conveyor assembly comprises a conveyor frame 30 supporting a movable continuous belt 32 driven by means of a drive shaft (not shown), a gearing assembly and a driving prime mover such as an electric motor (not shown).

Oven enclosure 18 further includes an oven cavity or cooking chamber 34 in which conveyor assembly 28 is horizontally disposed, an upper elongated air duct 36 and lower elongated air duct 38. Air ducts 36 and 38 are connected to upper and lower plenums (not shown) which include respectively an upper plenum opening 40 and a lower plenum opening 42.

Upper air duct 36 has a plurality of nozzles 44 directed downwardly toward conveyor assembly 28. Lower air duct 38 has a plurality of upwardly directed nozzles 46. Nozzles 44 and 46 are designed to direct columns of heated air against the top and bottom surfaces of a pan 66 which is located on conveyor belt 32. The columns of air impinge upon the surfaces of pan 66 to heat the pan thereby. Air ducts 36 and 38 include respective inner nozzle plates 48 and 50 which are spaced apart from the respective outer nozzle plates 52 and 54. As illustrated in the cutaway portion of upper air duct 36, the spaced apart inner and outer nozzle plates 48 and 52 provide columns of heated air through nozzles 44. Similarly, inner and outer plates 50 and 54 of lower air duct 38 are spaced apart to provide columns of heated air through nozzles 46.

In operation, pan 66 contains a food product such as pizza and travels on moving belt 32 from the left side as seen in FIG. 1 toward the right side. Air is blown by a fan, (not shown), over electric heaters 56 and 58 into upper and lower air ducts 36 and 38. The inner and outer nozzle plates 48-54 will cause the heated air to be formed into columns which are impinged on both the bottom surface of pan 66 and the upper surface of the food product in pan 66. Nozzles 44 and 46 are shaped to provide standing columns of heated air for impinging upon localized areas of the top and bottom surfaces of pan 66. Nozzles 44 and 46 are provided in rows, as more fully disclosed in U.S. Pat. No. 4,462,383 and the rows are staggered so that full coverage of the pan bottom and top surfaces by the columns of heated air is provided as pan 66 travels along moving belt 32 through cooking chamber 34.

Pan 66 is specially configured as further described hereinbelow so that the columns of heated air will rapidly heat up the food product in the pan and raise the temperature of the food product to the desired temperature level to provide proper cooking of the food product therein within the desired amount of time.

Figure 2:
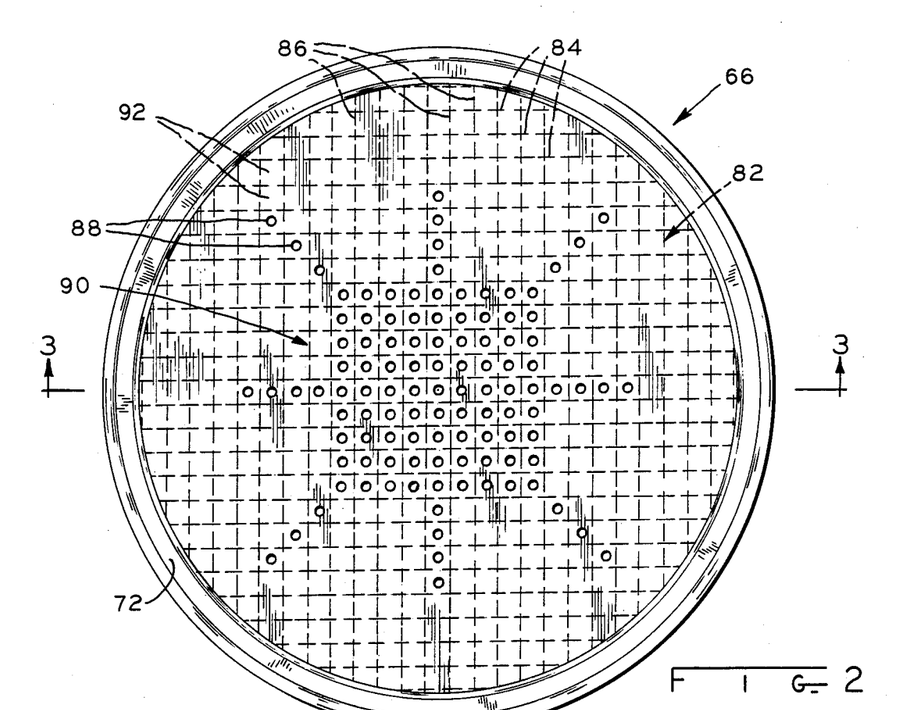
FIG. 2 is a plan view of a baking pan of intermediate size.
Figure 3:
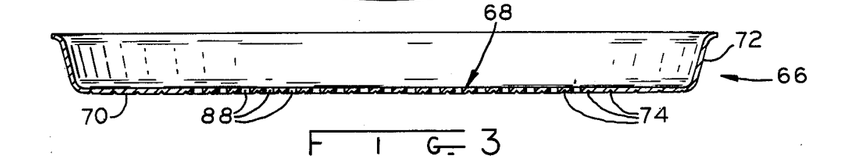
FIG. 3 is a front elevational view of a baking pan of intermediate size along the line 3—3 of FIG. 2.

Referring now to FIG. 2, a plan view of pan 66 is provided illustrating the location of grooves 74 in bottom 68 of pan 66. Pan 66 can be manufactured in a variety of sizes. The popular sizes for pizzas are large, intermediate and small, such sizes being respectively approximately 14 inches, 12 inches and 10 inches and the pan shown in FIGS. 2 and 3 is of the intermediate size. By referring to FIG. 3 it can be seen that pan bottom surface 70 has grooves 74 formed therein.

Grooves 74 are located at the positions indicated by dotted lines 84 and 86 in FIG. 2, thereby forming a grid pattern 82. Lines 84 and 86 are evenly spaced over bottom surface 70 of pan 66 and represent the centerlines of the grooves. The exact configuration of grooves 74 can be best seen in FIGS. 4, 9 and 10.

Figure 4:
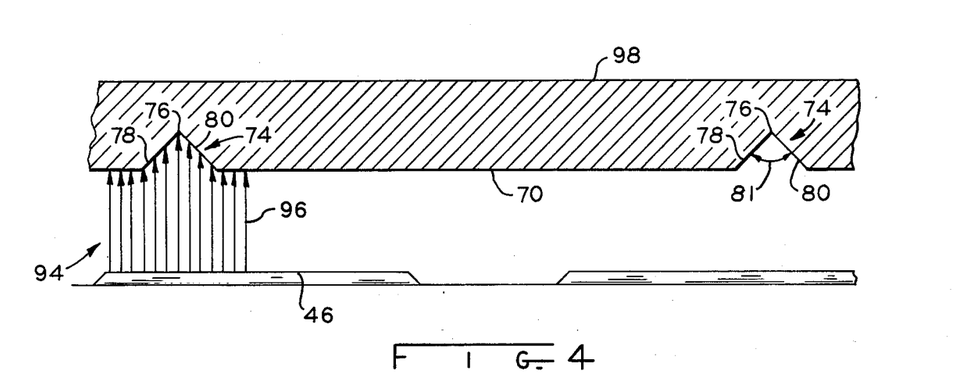
FIG. 4 is a diagrammatic view of the flow of columns of heated air from the oven nozzles to the bottom of a baking pan.
Figure 9:
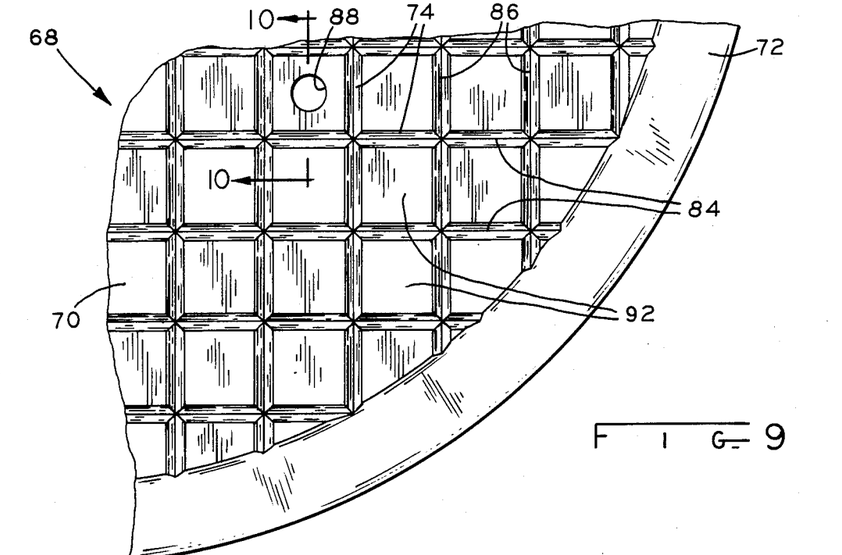
FIG. 9 is an enlarged cutaway bottom view of a portion of the baking pan of FIG. 2.
Figures 10, 11:
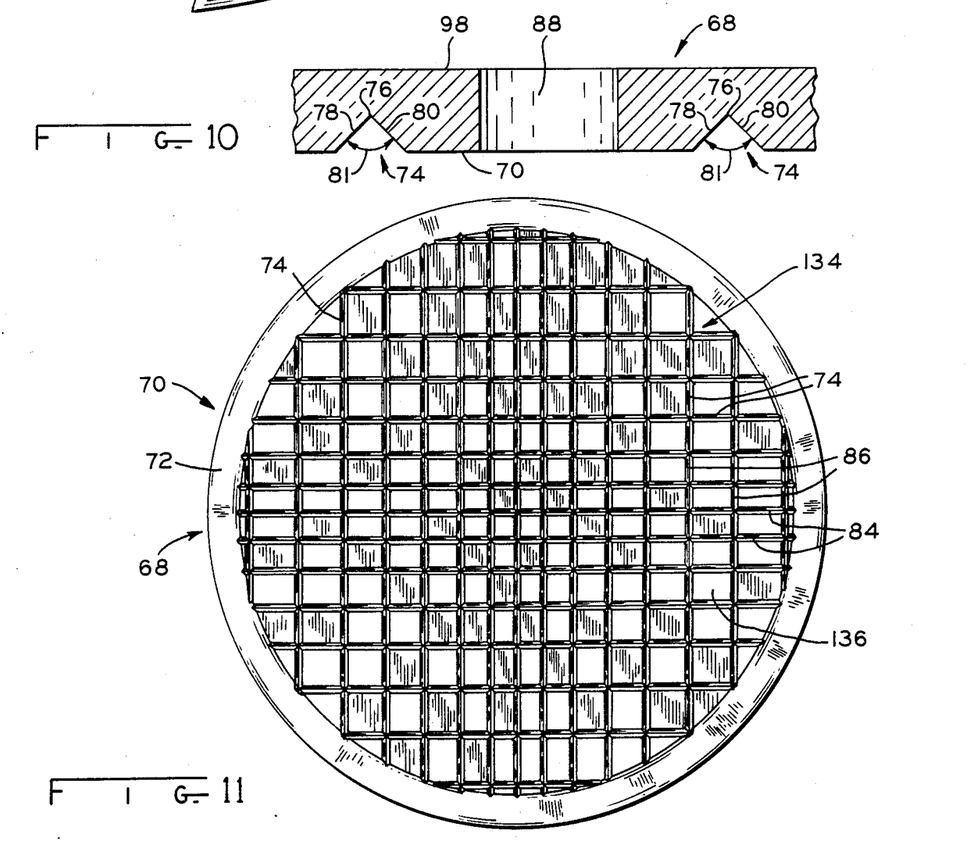
FIG. 10 is a sectional view of the baking pan bottom taken along the lines 10—10 of FIG. 9.
FIG. 11 is an illustration of a grid pattern of grooves in the bottom of a baking pan with a higher density of grooves in the center of the pan bottom surface than at the outside portions of the pan bottom surface.

Grooves 74 are generally V-shaped having sides 78 and 80 which meet at apex 76. Sides 78 and 80 form an included angle 81 here illustrated as 90°. For best results in the use of pan 66 for baking pizza the included angle 81 is in the range from 70° to 110°. The spacing of grid lines 84 and 86 is preferably such that the spaces between the lines are in the range of 0.25 inch to 0.75 inch. The pan 66 is preferably constructed of a heat conductive metal such as aluminum which also has acceptable manufacturing properties and which can be easily cleaned. The thickness of the pan bottom 68 is preferably in the range of 0.056 inch to 0.102 inch with a preferred thickness being 0.072 inch. The depth to which grooves 74 penetrate the bottom is preferably from 30% to 75% of the bottom thickness. Based on the above size ranges, a preferred embodiment of the invention would be an aluminum cooking pan with a bottom thickness of 0.072 inches and with the grooves spaced 0.50 inch apart and penetrating bottom 70 to a depth of 0.040 inches. In this embodiment, the thickness of the metal between the innermost point or apex 76 of groove 74 and the upper surface 98 of bottom 68 will be 0.032 inches. Grooves 74 can be formed in bottom 68 by means of a variety of methods, although in the preferred method the grooves are stamped into the bottom by means of a die. The bottom surface of the pan can be finished by anodizing the surface and forming a black "hard coat" coating thereon. The black coating will help in providing better heat absorption and also provides a hard finish for the surface to aid in cleanability and to prevent marring of the surface. By means of the anodizing treatment the product will become more durable for use in a commercial kitchen environment.

By referring to FIG. 4, the operation of the baking process utilizing pan 66 including grooves 74 is as follows. Columns of heated air will be formed by nozzles 46 and will be directed upwardly to impinge upon bottom surface 70 of pan bottom 68. It can be seen that by the formation of grooves 74 having sides 78 and 80, the amount of surface area of the pan bottom which is subjected to the heated air columns will be increased. The amount of surface area provided by sides 78 and 80 is greater than the amount of bottom surface area which would be provided if no grooves were formed in bottom surface 70. It can be readily understood that if sides 78 and 80 were perpendicular to surface 70, the surface area of bottom 70 would not be increased. Accordingly, the grooves should be configured to increase the pan bottom surface area. As illustrated sides 78 and 80 form two sides of a triangle having a base comprised of the bottom portion of groove 74. Due to the increased surface area by the formation of V-shaped grooves 74 in pan bottom surface 70, more heat is absorbed by bottom 68 from columns 94 than would be the case if no grooves were formed in bottom surface 70.

Additionally, the formation of grooves 74 in pan bottom surface 70 allows heat to travel a shorter distance through pan bottom 68 toward the food product than would be the case if no grooves were formed in the bottom surface. Sides 78 and 80 are a smaller distance from upper surface 98 than is surface 70, and therefore heat energy absorbed by sides 78 and 80 will travel more quickly to top surface 98 then from bottom surface 70. Thus, heat is absorbed more quickly into the food product in pan 66 by the addition of grooves 74 to bottom surface 70. The addition of V-shaped grooves to pan bottom 68 therefore causes more heat to be absorbed from the impinging air columns and causes heat to be more quickly transmitted to the food product in pan 66.

It can of course be readily understood that grooves 74 need not be V-shaped. The grooves could have various other configurations. However, as explained hereinabove it is important that the sides of the grooves be disposed at an angle smaller than 90° with respect to surface 70 so that the groove sides will be directly impinged upon by heated air emitted by nozzles 46. If a square groove were to be formed in bottom surface 70 the sides of the groove would not act as heat absorbing surfaces because air columns 94 would not impinge directly on the sides.

The combination of grooves 74 with relatively thick bottom 68 is also advantageous since the thick metal left between grooves 74 absorbs and retains heat so that, after pan 66 leaves cooking chamber 34, heat retained by bottom 68 will continue to be given off to the food product. By this process, cooking will continue even after pan 66 leaves the cooking chamber 34. Therefore, the proper thickness of bottom 68 will diminish the amount of time that pan 66 needs to be inside cooking chamber 34. On the other hand, the addition of grooves 74 ensures that more heat will be absorbed by bottom 68 and will more quickly travel to the food once pan 66 enters the cooking chamber. Thus, with this advantageous configuration of pan 66, cooking will begin soon after pan 66 enters cooking chamber 34 and will continue to proceed after pan 66 leaves cooking chamber 34. Thus, during virtually the entire travel path of pan 66 through cooking chamber 34 cooking the food product will take place.

Referring again to FIGS. 2, 3, 9 and 10, bottom 68 is also provided with apertures 88. These apertures are located in the interstitial bottom surface areas bounded by grooves 74. By means of the formation of apertures 88, heated air can reach the food product directly and therefore heat can be absorbed more quickly into the food product once the pan enters the oven cooking chamber. The addition of holes 88 further improves the speed with which the food product is baked. By referring to FIG. 3, it can be seen that pattern 90 according to which holes 88 are distributed over bottom surface 70 creates a more dense distribution of holes toward the center portion of bottom surface 70 than toward the outside portions thereof. It has been found that sufficient heat is absorbed into the portions of the food product adjacent side 72 of pan 66 so that no holes are needed in the outside portions of pan bottom surface 70. If holes were provided in the entire bottom area of the pan, cooking of the pizza would not be uniform and the sides of the pizza would be baked prior to the baking of the center portion. This would result in overcooked sides of the pizza. It has been found that the preferred distribution of holes in the bottom of pan 66 is to have a perforated pan bottom area portion in the range of 5% to 40% of the total pan bottom surface and having the holes more densely spaced toward the center portion of the bottom surface.

Figure 5:
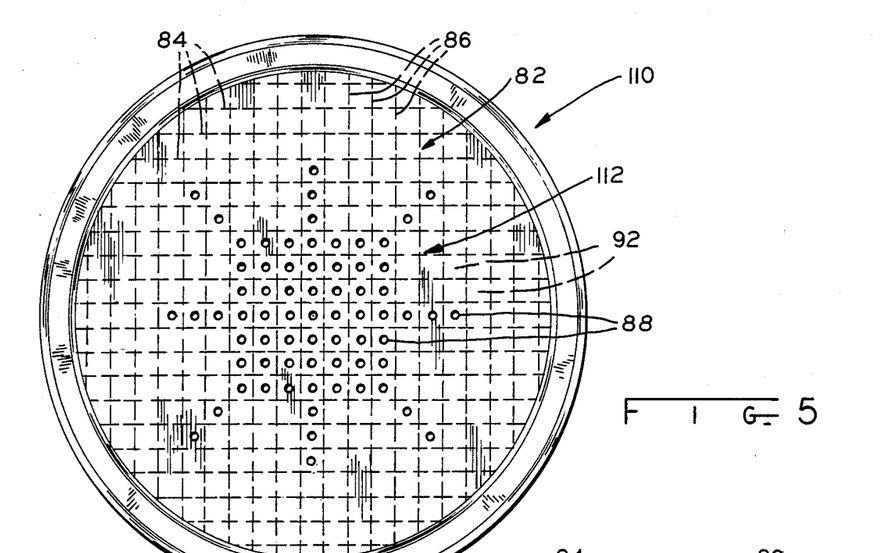
FIG. 5 is a plan view of a large baking pan.

Referring now to FIG. 5, a plan view of a large pizza pan is shown embodying the invention. Grid 82 is again formed by parallel grooves 74 located along lines 84 and 86 with the spaces between those lines again in the range of 0.25 inch to 0.75 inch. Similarly the depth of the grooves and the thickness of the bottom is chosen to be in the same size ranges as given in connection with FIGS. 2, 3 and 4. The aluminum bottom has a thickness in the range of 0.056 to 0.102 inch. The depth of the grooves is in the range of 30% to 70% of the thickness of the bottom and the included angle of the V grooves is in the range of 70° to 110°. Apertures 88 are located in the interstices 92 formed by grooves 74 in a pattern 112 and the proportion of bottom surface area occupied by apertures is again in the range of 5% to 40% of total bottom surface area.

Aperture pattern 112 is again chosen to have a more dense distribution of apertures at the center of bottom surface 70 of pan 110 then at the side portions of bottom surface 70. By means of this distribution of the apertures, cooking of the pizza will be uniform since sufficient heat is absorbed into the pizza through sides 72 of pan 110 to accomplish proper cooking of the outside portions of the pizza in the desired amount of time.

Figure 6:
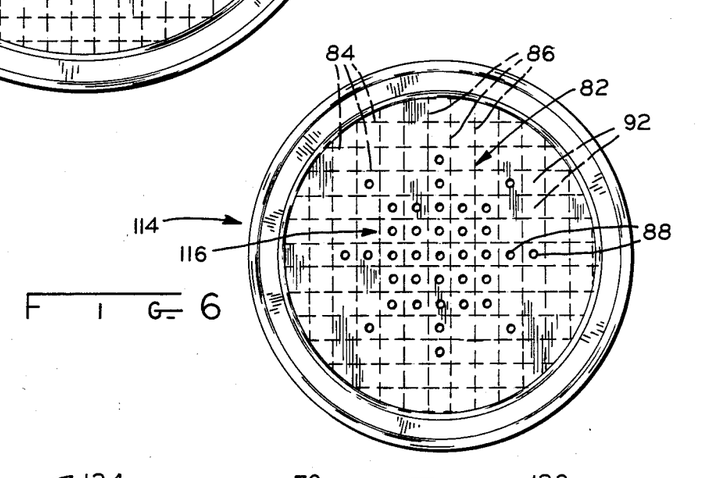
FIG. 6 is a plan view of a small baking pan.

FIG. 6 shows a small pizza pan 114 having a grid pattern 82 formed by parallel lines 84 and 86 along which grooves 74 are located. Similarly an aperture pattern 116 is shown for apertures 88 located in the interstices 92 of grid 82. As discussed in connection with FIGS. 2 and 3, the bottom of pan 114 has a thickness in the range of 0.056 inch to 0.102 inch. Grooves 74 are spaced apart a distance in the range of 0.25 to 0.75 inch. The amount of surface area of bottom 68 occupied by holes 88 is in the range of 5% to 40% of the total area of bottom surface 70. The depth to which grooves 74 penetrate bottom 68 is in the range of 30% to 70% of the pan bottom thickness and the grooves are V-shaped with an included angle in the range of 70° to 110°.

As discussed in connection with FIGS. 2 and 5, the distribution pattern 116 of apertures 88 is again such that apertures 88 are most densely distributed at the center portion of the bottom surface 70. Sufficient heat is absorbed through sides 72 of pan 114 to allow for proper cooking of the outside portions of the pizza in the desired amount of time.

Figure 7:
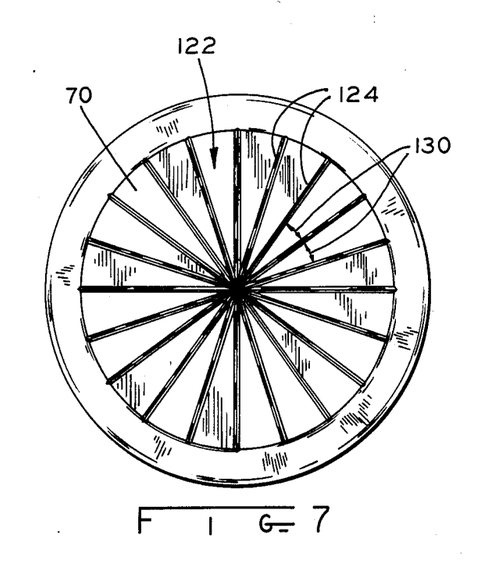
FIG. 7 is an illustration of a star shaped groove pattern on the bottom surface of a baking pan.

Turning now to FIG. 7, an alternate embodiment of a groove pattern is shown. Star pattern 122 is comprised of grooves 124 which radiate outwardly from the center of the bottom surface 70. Holes 88 (not shown) would be located between grooves 124 and would occupy a pan bottom surface area portion in the range of 2% to 10% as discussed above. The holes would be more densely spaced at the center portion of surface 70 as discussed above. Grooves 124 are shaped similarly as described above in connection with FIGS. 2 through 6.

Figure 8:
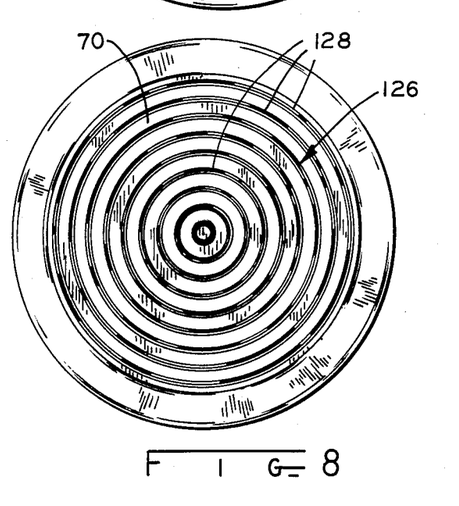
FIG. 8 is an illustration of a concentric circle groove pattern on the bottom surface of a baking pan.

A yet further embodiment of a groove pattern is given in FIG. 8. The pattern of grooves 126 comprises a plurality of concentric circles spaced apart in the range of one quarter of an inch to three quarters of an inch. Holes 88 (not shown) would be located between the concentric circles and would be more densely arranged in the center of bottom surface 70 than toward the outside of bottom surface 70.

With reference to FIGS. 7 and 8 it should be understood that the included angles 130 between grooves 124 and the spacing between grooves 128 should be such that a sufficient linear amount of groove length is formed in the bottom surface of the pan to allow for proper cooking of the pizza. As discussed in detail above, the configuration of the grooves needs to be properly designed for thermal balance so that all portions of the pizza are cooked properly in the desired amount of time. Similarly, the location of the holes in bottom surface 70 of pans having a grooved pattern according to either FIG. 7 or 8 is to be such that proper thermal balances are created for uniform cooking of the pizza as explained hereinabove.

Referring now to FIG. 11 another grid pattern arrangement 134 is shown. Grooves 74 in this pattern are spaced more closely at the center portion of the pan bottom surface 70 than at the outside portions of the pan bottom surface 70. By means of this arrangement interstices 136 formed by grooves 74 along lines 84 and 86 are smaller at the center of pan bottom surface 70 than at the outside portions of pan bottom surface 70. This arrangement results in more heat absorption by the center portion of pan bottom surface 70 than by the outside portions thereof, since a greater amount of surface area is created at the center portion of pan bottom surface 70 by grooves 74 than at the outside portions of pan bottom surface 70. Furthermore, as explained hereinabove, heat will travel more quickly through pan bottom 68 at the center portions of the bottom than at the outside portions of the bottom since the groove sides are closer to the inside surface of the pan bottom. Apertures 88 (not shown) and the aperture pattern must be arranged in such a way in the pan having the grid configuration of FIG. 11 so as to set up a proper thermal balance to ensure uniform cooking of the pizza food product within the desired amount of time.

It should be understood that, while the food product to be prepared in the baking of this pan invention has been described as pizza, the pan and baking method may also be used with other food products and the invention is not limited to the preparation of pizza.

While this invention has been described as having a preferred design, it will be understood that it is capable of further modification. This application is therefore intended to cover any variations, uses, or adaptations of the invention, following the general principles thereof and including such departures from the present disclosure as come within known or customary practice in the art to which this invention pertains and fall within the limits of the appended claims.

What is claimed is:

1. A pan for baking a food product comprising: a side and a bottom, said bottom having at least one through aperture therein and including a substantially flat, unbroken inner surface and an outer surface, said outer surface having at least one groove therein, the thickness of said bottom being nonuniform.

2. The pan according to claim 1 wherein said groove is generally V-shaped.

3. The pan according to claim 1 including a plurality of grooves, said grooves being arranged generally orthogonally to each other in a grid pattern.

4. The baking pan according to claim 1 and including a plurality of grooves in said outer surface and a plurality of apertures in said bottom.

5. The pan according to claim 4 wherein said plurality of grooves are arranged in a star shaped pattern, said grooves being directed radially outwardly from the center of said surface.

6. The pan according to claim 4 wherein said grooves are arranged in a pattern of concentric circles.

7. The pan according to claim 4 wherein the density of said apertures at the center portion of the bottom surface is greater than at the outside portion of said bottom surface.

8. The pan according to claim 4 wherein the surface area occupied by said apertures comprises an area in the range of 5% to 40% of the total bottom surface area.

9. The pan according to claim 4 wherein the thickest portion of said bottom has a thickness in the range of 0.056 inch to 0.102 inch.

10. The pan according to claim 4 wherein the thickest portion of said bottom is in the range of 0.056 inch to 0.102 inch and wherein said grooves are V-shaped.

11. The pan according to claim 4 wherein said plurality of grooves are arranged in a pattern of intersecting lines, and wherein said apertures are arranged in at least some of the interstices formed by said intersecting lines.

12. The pan according to claim 11 wherein said pattern of intersecting lines comprises an orthogonal grid pattern.

13. The pan according to claim 12 wherein the parallel grooves of said grid pattern are spaced apart a distance in the range of 0.25 inch to 0.75 inch.

14. A pan for baking a food product comprising:
a side portion;
a generally flat bottom including a substantially unbroken flat inner surface and a plurality of V-shaped grooves located in the outer surface of said bottom whereby the thickness of said bottom is nonuniform, said grooves being arranged in a pattern, the included angles defined by the sides of saig grooves being in the range of 70° to 110°, said bottom further including a plurality of through holes, said holes being located in at least some of the surface areas bounded by said grooves, the density of holes being greatest in the center portion of said bottom surface, said holes occupying a surface area in the range of 5% to 40% of the total surface area of said bottom.

15. The pan according to claim 14 wherein said pattern comprises a star-shaped pattern of grooves directed radially outwardly from the center of said bottom surface.

16. The pan according to claim 14 wherein said pattern comprises a plurality of concentric circles.

17. The pan according to claim 14 wherein said grooves occupy a surface area of said bottom surface in the range of 25% to 75%.

18. The pan according to claim 14 wherein said pattern comprises a grid of orthogonally arranged grooves.

19. The pan according to claim 18 wherein said grooves are more closely spaced toward the center portion of said surface whereby the interstitial areas bounded by said grooves comprise smaller surface areas toward the center portion of said surface than toward the outside portion of said surface.

* * * * *

UNITED STATES PATENT AND TRADEMARK OFFICE
CERTIFICATE OF CORRECTION

PATENT NO. : 4,676,151

DATED : June 30, 1987

INVENTOR(S) : Roger K. Gorsuch

It is certified that error appears in the above-identified patent and that said Letters Patent is hereby corrected as shown below:

Claim 14, Col. 12, line 1, change "saig" to --said--.

Signed and Sealed this

Third Day of November, 1987

Attest:

DONALD J. QUIGG

Attesting Officer

Commissioner of Patents and Trademarks